United States Patent [19]

Hartman

[11] Patent Number: 5,296,256
[45] Date of Patent: Mar. 22, 1994

[54] METHOD AND APPARATUS FOR PAINTING HIGHWAY MARKINGS

[75] Inventor: William H. Hartman, Sacramento, Calif.

[73] Assignee: Research Derivatives, Inc., Sacramento, Calif.

[21] Appl. No.: 999,719

[22] Filed: Feb. 16, 1993

Related U.S. Application Data

[62] Division of Ser. No. 618,674, Nov. 27, 1990, Pat. No. 5,203,923.

[51] Int. Cl.[5] .............................................. B05D 5/00
[52] U.S. Cl. ...................................... 427/10; 427/137; 427/140; 427/286
[58] Field of Search ................. 427/10, 137, 286, 140, 427/385

[56] References Cited

U.S. PATENT DOCUMENTS

3,229,660 1/1966 McLucas et al. .................... 118/305
4,167,592 9/1979 Gabel ................................... 427/137
4,699,510 10/1987 Alguard .................................. 356/73
5,054,959 10/1991 Wilson et al. ......................... 404/94

Primary Examiner—Janyce Bell
Attorney, Agent, or Firm—Owen, Wickersham & Erickson

[57] ABSTRACT

A method and apparatus for painting traffic marking lines over old paint markings on road pavement is disclosed. The apparatus, normally installed on a marking vehicle having a paint gun and a paint supply, includes a detector which illuminates the pavement and utilizes a spectroscope to analyze the return inspection for the presence of one or more known preselected constituents of the old paint marking to control actuation of the valve on the paint gun and also track the old pavement marking. The apparatus also provides a paint gun delay function to account for the lead distance between detector and paint gun and enables the application of new paint markings directly over the old markings at a relatively high rate of vehicle speed.

12 Claims, 9 Drawing Sheets

METHOD AND APPARATUS FOR PAINTING HIGHWAY MARKINGS

This is a division of co-pending application Ser. No. 07/618,674 filed on Nov. 27, 1990 now U.S. Pat. No. 5,203,923.

This invention relates to automatic painting controls and more particularly to a method and apparatus for painting traffic lane markings and centerline stripes on roads and highways or airport runways.

BACKGROUND OF THE INVENTION

The repainting of old highway stripes or markings requires accurate registration of the application of the new paint with that of the old marking pattern. In the past, even experienced paint machine operators found that when using machines having manually attended prior art control methods, higher rates of travel made it increasingly difficult if not impossible to paint the new markings at precisely the desired location on the road surface. Clearly, some method of automatic control was needed.

Heretofore, many attempts were made to optically detect the presence of the old marking pattern and to use the output of the detector to automatically switch the paint gun on when the detector sensed the brighter paint line against its background, and to switch the gun off when the detector no longer sensed the presence of the brighter surface. Such attempts were less than satisfactory because all such prior art detectors relied upon the supposed contrast of the reflected incident light from the surface under observation as compared with that of an assumed threshold background light level representing the absence of the paint line. The methods were lacking in reliability in spite of the chosen sources of illumination, whether natural daylight or that provided by strong incandescent lamps.

The amount of brightness differences between a painted line and that of the background surrounding it will vary greatly depending upon the color of the pavement, wear of the paint line, and presence of other discolorations that could activate the prior art detection methods. These earlier methods were also seriously compromised when the pavement had varying ambient illumination, such as when working in areas having alternate sunlight and shade in the path of travel or when the base pavement material changed in adjacent areas, as from concrete to asphalt, for example.

Even when methods were augmented by techniques of color filtering of the reflected light from the surface under observation to give preference to that of the color of the painted marking, such prior art methods were seriously lacking in reliability. This was due to imperfect ability of the prior art detectors to give preference to the reflected brightness of faded or worn painted surfaces as compared with those of adjacent areas of the pavement having various surface characteristics with similar color values and brightness levels.

Because the prior detection methods were not dependable under less than ideal operating conditions, they seriously hampered the successful use of fully automatic guidance methods for positioning the application of new paint directly over the old paint marking patterns. Under those circumstances, a miscue from the detector would cause the paint to be sprayed in the wrong place, a defect not easily remedied after the fact.

Another deficiency of prior art methods of paint line detection was that they could not be made to recognize the presence of black paint on the pavement. It is not universally appreciated that on many roads and highways a great deal of black paint is also used in conjunction with the application of the more familiar yellow or white lane and centerline markings. Black paint is used to give additional contrast for higher visibility, especially on concrete road surfaces where the brightness of the light colored concrete roadway would tend to subdue the visual effectiveness of the brightness of the painted markings. It is also frequently applied in alternate sequence to the normal skipline color markings of roadway centerlines between double solid lines in no-passing zones, and to enhance the edgelines adjacent to the medians separating traffic flowing in opposite directions. The prior art brightness contrast detection methods were of little value as a reliable means for detecting presence of a paint color (e.g. black) that was at the outset intentionally placed on the pavement to be obscure.

With the expansion of highway and road systems a serious need arose for an improved marking system capable of overcoming the limitations and deficiencies of prior systems and also one that was preferably automatic so as to increase the speed of applying roadway markings. Automation of the repainting process involved the satisfactory solution of several practical problems. It was necessary for the control to sense the beginning of the stripe to be repainted, to sense the line continuation and to sense the end of the line marking when the sensing means was used to control paint guns. In addition, it was also necessary for the sensing control to anticipate each of these events in such a fashion that the paint gun turn-on and turn-off delays would not cause the paint application to be late thereby causing the paint to be applied after the paint machine had travelled beyond the proper target locations that initiated the action.

Furthermore, it was also essential that an improved detection method provide enough lead time before the responding paint gun operates in order to allow for the unavoidable operating delay of the gun and for the operating delay time of any positioning mechanism that might be used.

For a more fully automatic control the paint gun package must be capable of moving laterally from side to side to correct for any misalignment due to imperfect positioning of the spray gun in order for the paint application to track the old longitudinal paint markings. This lateral motion must be done quickly so that any lack of alignment will be fully corrected by the time the paint gun arrives at the target location to prevent painting a "hook" at the start of the repainted stripe. The response time of any positioning servomechanism used to position the gun package must be fast enough to satisfy this requirement. For example, it may be called upon to move a gun package mass weighing up to perhaps 500 pounds, and to laterally move such a load 2 inches in as little as 20 milliseconds when travelling at turnpike speeds. Many larger traffic paint marking machines of the prior art have employed gun positioning methods, usually operated by a manually controlled steering wheel. Both mechanical rack and pinion gear methods, as well as hydraulically assisted steering arrangements have been used. A high speed fully automatic control method must include similar positioning elements within a servo-control mechanism, and the sizing of the servo elements such as hydraulic system pressures, piston stroke and diameter and fluid flow rates, for example, must provide for quick response, as described previously. A sensing method for guiding the positioning servo must have the ability to provide left-right positioning error signals with reference to the centerline of the old paint pattern as the pavement is viewed by the detector at the target area. Heretofore attempts were made to employ television cameras for scanning the area udder inspection in order to derive an error signal from the scanned scene television signal. Although the scanning technique provided left-right positioning error signals, the television camera has proved to be no better at discriminating against undesired pickup signals than other prior art optical detection methods, for the same reasons previously discussed.

SUMMARY OF THE INVENTION

The present invention avoids the deficiencies of the prior art methods and provides an apparatus that utilizes a new unambiguous method of detection of previously painted markings for controlling a traffic paint marking vehicle and painting marking lines at a relatively high rate of speed. The method of the present invention does not depend upon the direct reflection of incident light from an old marking line. Indeed, it rejects incident light reflections to the greatest extend possible while providing a detection response that is virtually independent of the intrinsic visual brightness of the road surface under examination. The present method looks instead to the nature of the chemical makeup of the surface being examined. Thus, detection is specific for the chemical elements and compounds of the paint film being sought and is otherwise indifferent to any other bright substances that heretofore confused prior brightness contrast detection systems.

A road marking control apparatus embodying principles of the present invention is adapted for installation on a marking vehicle equipped with spray guns, spray tanks, pneumatic and hydraulic pumps, an operator controlled skipline timer and a paint gun control apparatus including an old marking detector. The control apparatus comprises a high energy, UV illuminating source which provides proper spectral emissions to stimulate fluorescent radiation from the road surface under examination and more specifically from the residual paint particles of the old marking line on the road pavement. The return fluorescent emissions from the pavement surface enter a detector device spaced from the illuminating source. These emissions are passed through a lens system and into a monochromator which separates the emission wavelengths so that the principle characteristic emission of any one or more selected chemicals (known to be contained in the old marking paint being examined by the system) can be separated from any other emissions from the target surface. The monochromator has an exit mask which is designed to pass one or more spectral lines of the selected chemicals being detected. The passed emissions are directed to a photocathode or photomultiplier which provides an output signal roughly proportional to the intensity of the monochromator emission. The output signals from the photomultiplier are furnished to a control circuit that operates the paint guns of the system. The signal path of the control circuit includes a delay line which operates to delay the paint application signal to account for any vehicle lead distance between the position of the paint gun and the target surface. The control apparatus may also include a servo control for tracking the old paint line and for laterally positioning the paint gun to keep the new paint in alignment with the old paint. This tracking section of the apparatus uses two photomultiplier tubes which are placed in an optical split field arrangement so that each tube views separate portions of the image plane of the monochromator exit mask.

In using my control apparatus and applying the steps of my method, the marking vehicle is moved over the area of pavement under inspection as the target surface is irradiated by the illumination from the high energy short wave UV radiation source. The wavelength of illumination source is tailored to fit the characteristics of the chemical compounds being sought, and thus may be selected from any part of the spectrum including the visible and infrared regions. The present example of short wave UV illumination is merely illustrative and should not be considered restrictive. The incident illumination will cause various chemicals that constitute the makeup of the pavement surface to absorb the intense radiation and then convert the radiation to other forms of energy, such as heat or light in energy bands of wavelengths that are unique to the chemicals themselves. Each chemical, when properly stimulated to higher energy states, has its own fingerprint, or spectral emission lines that can be uniquely identified by spectral analysis of the emission, whether in the visible region, or in the ultra violet or infra-red portion of the spectrum. If indeed there are detectable stimulated emissions from the desired chemical compounds being sought, then my detection method will detect those specific portions of the line spectrum by means of a spectroscopic analysis method that employs masking (as described) to respond to only those portions of the spectrum that correspond to the chemicals being sought.

Some significant advantages of my new method according to the present invention are that: (1) It achieves greater reliability of operation when tracking worn patterns under less than ideal surface conditions; (2) It is virtually indifferent to stray light and improves the ratio of desired signal-to-noise by a factor of approximately 1000 to 1; (3) It rejects response to undesired artifacts and has a near zero probability of false signals from bright surfaces not containing the chemicals for which the equipment has been sensitized; (4) It will permit tracking painted lines of black paint or other low visibility colors having little reflectance of incident illumination. Such dark colors may be tagged with harmless fluorescent chemicals having no latent environmental hazards; (5) With proper preparation of the pavement surface, it can be used for finding and tracking cracks in the surface and can be used to control automatic crack filling machines; (6) It also enables a significant increase in speed of operation of traffic paint stripers (marking machines) by relieving the machine operator of the necessity of judging the time to begin and end paint application at the onset and end of skipline stripes, and of having to exercise heroic skill in guiding the paint guns over the old patterns. The improved speed of response of my method is much better than the capabilities of human reaction time, and is not subject to fatigue; (7) It may also be used in an optical split-field arrangement to obtain lateral position sensing error signals for automatic servo tracking systems without the need for scanning methods, although such methods may be incorporated in my invention if desired; and (8) It eliminates paint line longitudinal registration errors caused by paint gun turn-on delay times at all practical vehicle rates of travel used when painting, for both paint and reflective glass bead application.

Other objects, advantages and features of the present invention will become apparent from the following detailed description of preferred embodiments, presented in conjunction with the accompanying drawing.

DETAILED DESCRIPTION OF EMBODIMENTS

Figure 1:
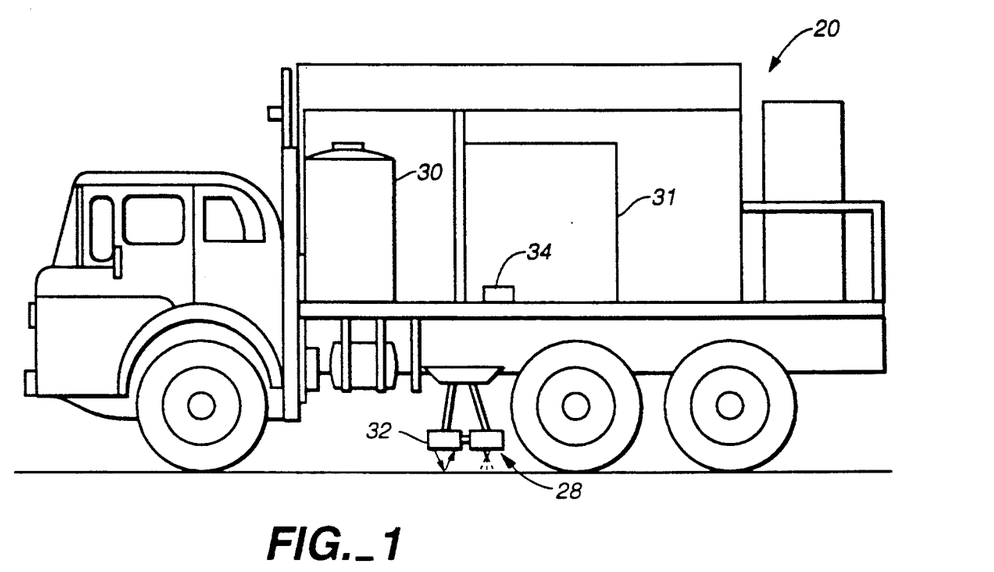
FIG. 1 is a view in elevation showing a typical traffic paint marking vehicle for painting lane markings and centerline skipline patterns on freeways and expressways and equipped with apparatus for spray painting the lines while underway according to the present invention.
Figure 2:
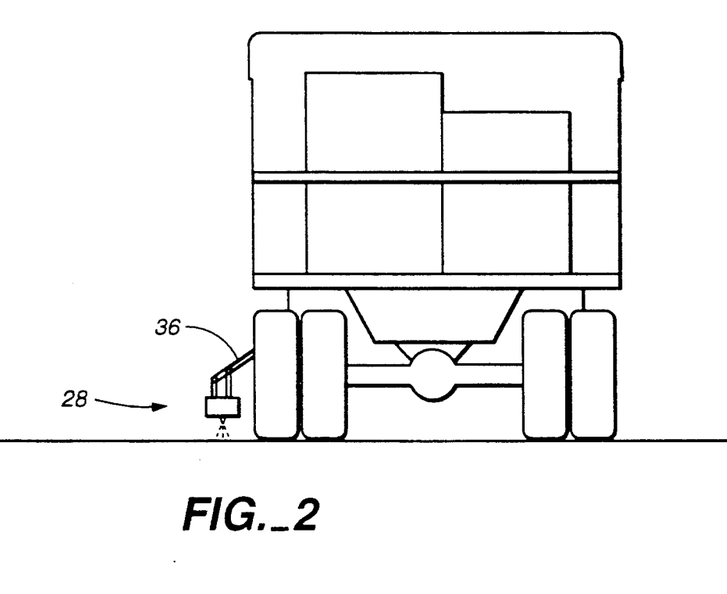
FIG. 2 is a rear view of the vehicle depicted in FIG. 1, showing the paint dispensing guns mounted as a gun package for use on the left side of the vehicles.
Figure 3:
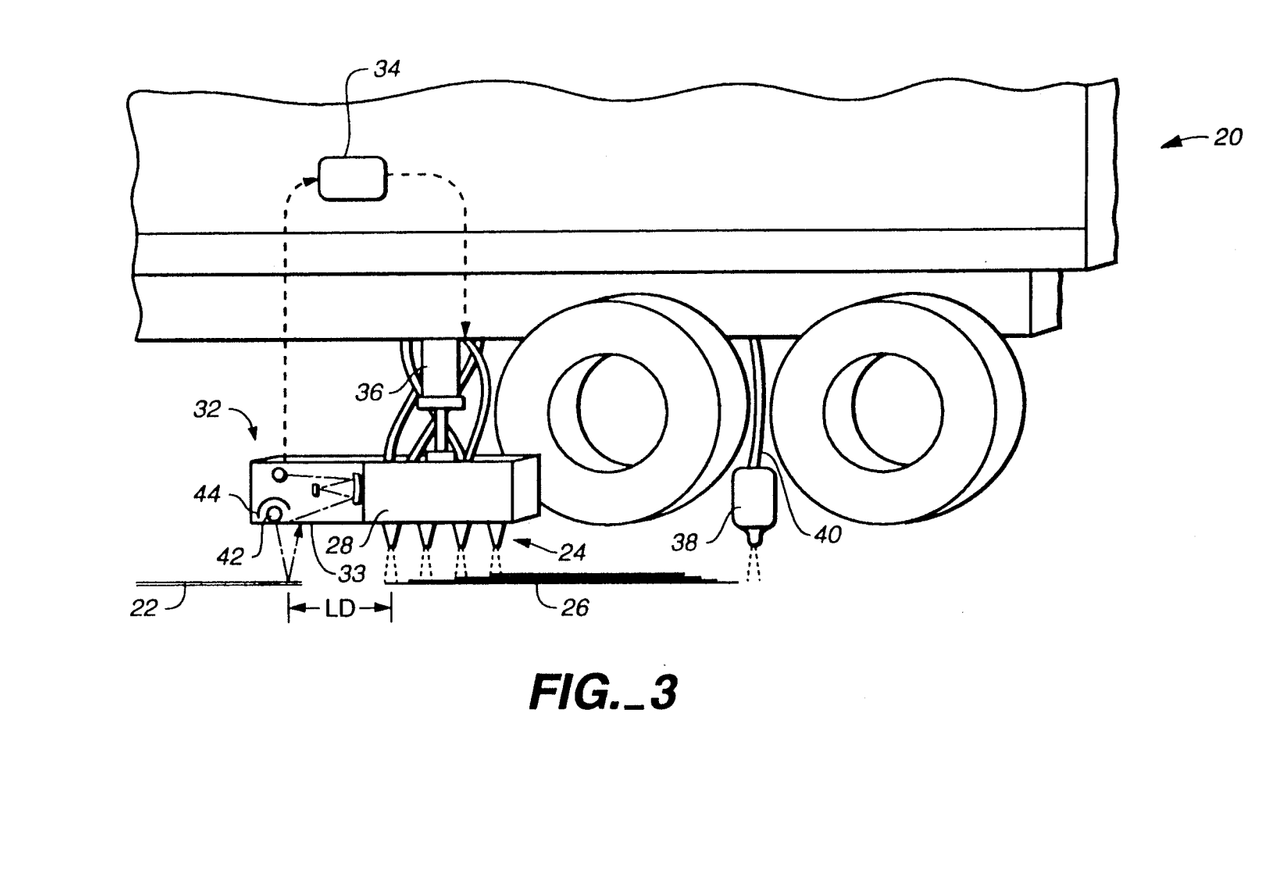
FIG. 3 is a fragmentary view in elevation of a traffic paint marking vehicle with attached apparatus according to the present invention for inspecting the surface ahead of paint guns and for controlling the on and off commands for paint application.

With reference to the drawings, FIG. 1 shows a typical road marking vehicle 20 which is shown in position for moving along a road surface adjacent an old paint line 22 thereon and utilizing an apparatus 28 for applying a new paint line 26 over the old line in accordance with the principles of the invention. The vehicle 20 has the customary equipment for spray painting lines while underway, including one or more paint spray guns in a paint gun package 28, paint tanks 30, pneumatic and hydraulic pumps 31, and additionally, a detection package 32 including a spectroscopic detector 33 and a paint gun control device 34 embodying principles of the invention. As shown in FIG. 3, the paint gun package 28 is attached to the vehicle 20 by suitable support means 36 so as to extend downwardly from its left side, thereby enabling the vehicle to move along the right side of the old paint line 22 with the paint spray guns directly above it.

Turning to FIG. 3, the detection package 32 is shown attached to the forward end of the spray gun package 28, whereas the control device 34 may be installed at any convenient location on the vehicle chassis. Spaced behind the paint gun package 28 is a bead gun package 38 of the well known type supported on the vehicle by movable means 40 and utilized for dispensing glass beads, when activated, onto the new paint.

The detection package 32 comprises an ultraviolet (UV) light source 42 mounted within a reflector 44 which directs a beam of light downwardly onto the road surface below. The spectroscopic detector 33, as shown diagrammatically in greater detail in FIG. 5, has an objective lens 46 spaced from the light source is sized to view reflected light from a small area of the old paint line 22 on the road surface through an opening 48 in the detector housing. The objective lens is preferably comprised of a pair of convex lens members 50, 51 connected together to form a double convex unit. Within the detector housing, the image from the objective lens 46 passes through a slit in an entrance mask 52 and is reflected from a plane mirror 54 into a concave collimating mirror 56. Spaced from the collimating mirror and receiving light from it is a refraction grating 58. Light from the refraction grating is reflected back to the collimating mirror and from it through a slit in an exit mask 60. The plane and collimating mirrors 54, 56, the refraction grating 58 and the masks 52 and 60 are preferably all contained within an internal housing called a monochromator 62.

Figure 5:
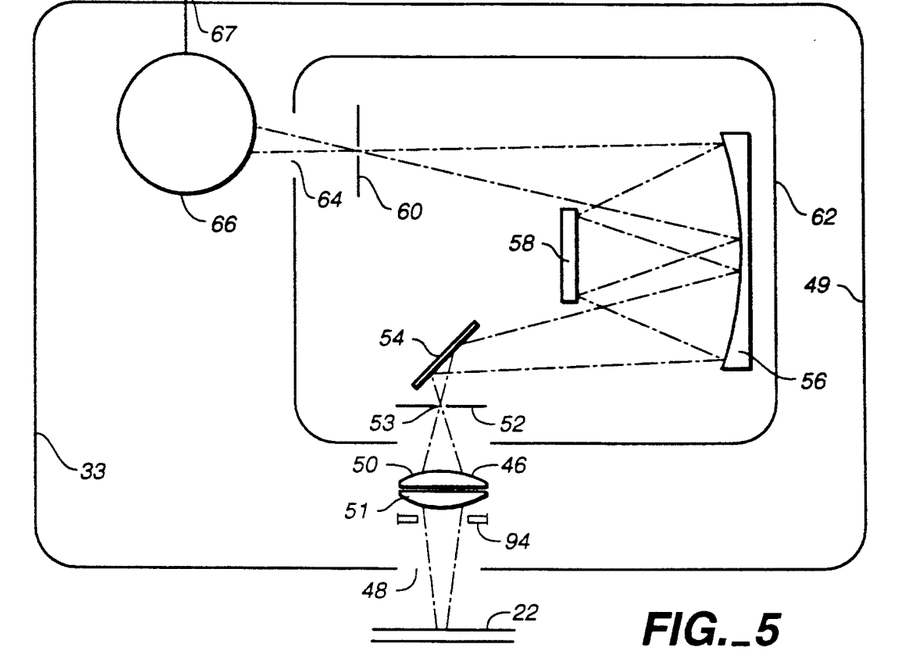
FIG. 5 is a diagrammatic view showing principle optical elements of a spectroscopic detector for the apparatus of FIG. 4A.

The light through the exit mask slit passes through an exit opening 64 in the monochromator and impinges upon a photomultiplier tube 66. The latter produces an output via a lead 67 in response to light from the monochromator and provides it to the control device 34.

Figure 4A:
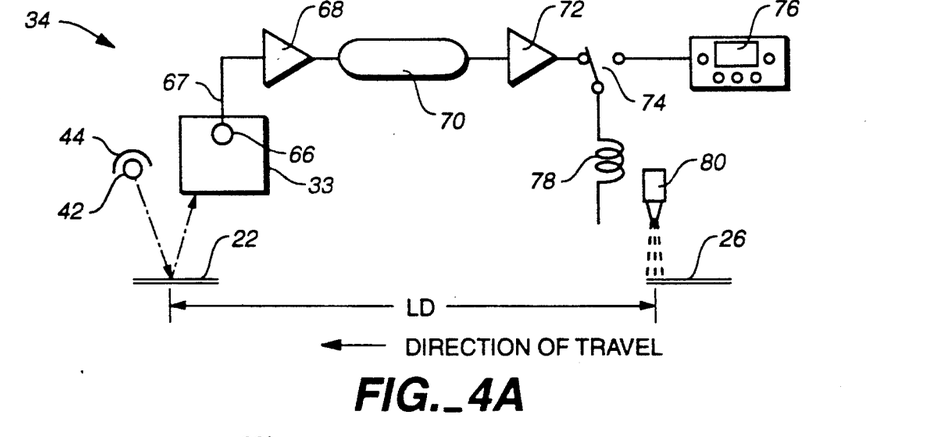
FIG. 4A is a block diagram of inspection and control elements for the embodiment of the invention illustrated in FIG. 3.

As shown in FIG. 4A, the control device 34 comprises a detector amplifier 68 whose output is supplied to a delay line 70 connected to a valve drive amplifier 72. The output from amplifier 68 is connected to one contact of a single pole, double throw switch 74 whose other contact is connected to a conventional electronic skip timer 76. The latter is used where intermittent marking lines are required as explained below. The switch arm of switch 74 is connected to a solenoid 78 which operates a valve on one or more paint guns 80 in the conventional manner.

Figure 4B:
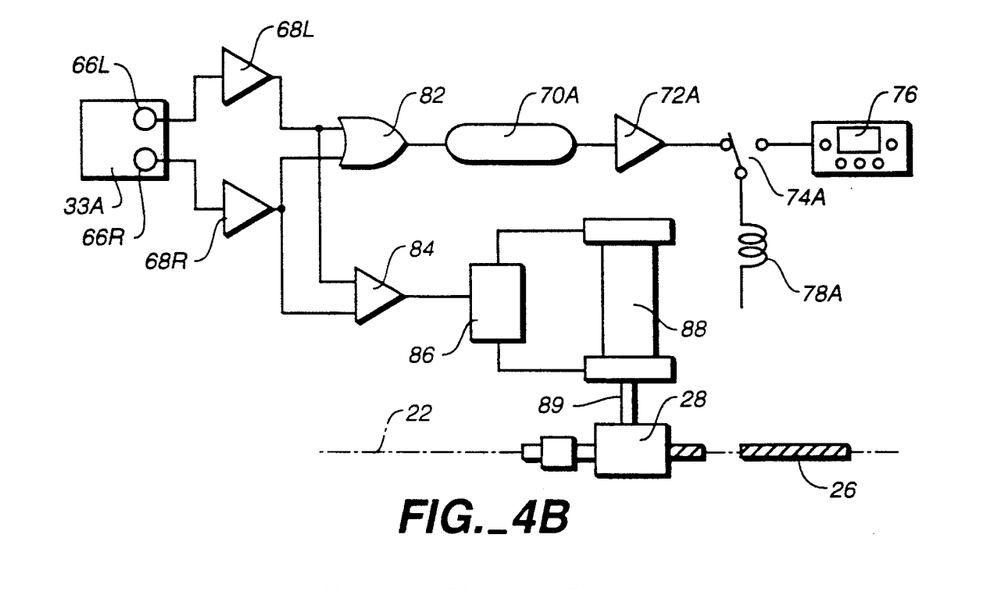
FIG. 4B is a block diagram of inspection and control elements for another embodiment of the present invention having left-right lateral positioning correction.

In FIG. 4B, an alternate detector 33A arrangement is shown diagrammatically which utilizes a left photomultiplier tube 66L and a right photomultiplier tube 66R whose outputs are furnished to a left detector amplifier 68L and a right detector amplifier 68R. The outputs from these amplifiers are fed to a logic OR gate 82 and simultaneously to a differential amplifier 84. The OR gate output is fed to the delay line 70A, a valve drive amplifier 72A and through a switch 74A to a paint gun solenoid 78A, as previously described. The output from the differential amplifier 84 is furnished to a servo valve 86 which controls a positioning actuator 88. The latter has a movable ram 89 which is connected to the paint gun package 28 so that the latter can be moved to track and paint the new line 26 directly over the old paint line 22.

Figure 4C:
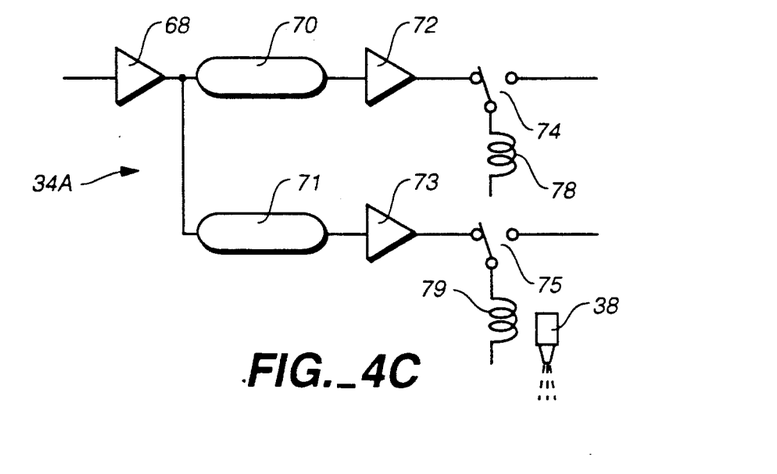
FIG. 4C is a block diagram of elements for an embodiment of my invention having separate paint and bead dispensing delay correction.

In some instances, where it is desired to dispense glass beads onto new paint, a control circuit 34A for the bead gun package 38 is provided, as shown in FIG. 4C. Here, a separate bead delay line 71 is connected to output from amplifier 68 and the delay output is supplied to a bead valve driver 73. The output from this driver is connected through a switch 75 to a bead valve solenoid 79 which controls the bead dispenser 38.

The operation of the road marking apparatus utilizing the detection method according to my invention may best be described by reference to FIG. 3. The UV illuminating source 42 having the proper spectral emissions to stimulate fluorescent radiation of a surface under examination is directed toward the area of the road surface viewed by the spectroscopic detector 33. Return fluorescent emissions entering the detector, as shown in FIG. 5, are focused by objective lens 46 upon the entrance slit of monochromator 62. The monochromator separates the emission wavelengths received by the detector so that the principal characteristic emission of any selected chemical known to be contained in the old paint 22 being examined by the system can be separated from any other emissions from the target surface that are of no interest. The monochromator 62 shown is one using the refraction grating 58 and collimating mirror 56, although a similar one of equal utility using instead the principle of a transmission grating, or a prism, could serve as well. The exit mask 60 with its single slit will pass only the single spectral line for which it is adjusted. For the purpose of the present invention it may under some circumstances be desirable to substitute a mask having more than one slit so that the device would be sensitized to a chemical having several strong spectral lines, or to enable the simultaneous detection of the emissions of a group of selected chemicals. Whatever emissions, if any, that pass through the exit mask 60 are directed to the photocathode of photomultiplier tube 66 which gives an output signal that is roughly proportional to the intensity of the emissions it receives from the monochromator 62.

As shown in FIG. 4A, the detector amplifier 68 amplifies the signal voltage developed by photomultiplier tube 66 as required and establishes an operating signal threshold above which the signal is allowed to operate the control of paint application. Included in the signal path is delay line 70, valve drive amplifier 72, switch 74 and paint valve solenoid 78.

The purpose of delay line 70 is to delay the paint application signal until the vehicle has traveled the intervening lead distance LD (see FIG. 6B) between the position of the paint gun 80 at the time the signal is detected and that of the leading target surface 90, should lead distance LD be a significant separation. The physical mounting of the inspection package 32 containing the illuminating source 42 and the companion spectroscopic detector 33 must be separated from the paint gun package 28 so that no paint overspray mist that may be generated can reach the field of view of the detector. The delay in turn-on of the paint gun 80 may alone be more than enough to compensate for the lead distance LD and may in some cases establish the minimum separation that can be used at high rates of travel. For example, a gun turn-on delay of 20 milliseconds would alone require approximately 21 inches of lead distance LD to achieve coincidence of paint at the location of the target surface 90 when traveling at 60 mph. If still greater separation is needed to accommodate excessive reaction time of a gun positioning servo for example, then added lead correction is introduced by the delay line 70 in the form of electrical delay of the valve operating signal. Valve drive amplifier 72 boosts the signal voltage and power level capabilities to operate paint valve solenoid 78. In many circumstances it is required that more than 1 solenoid be operated at the same time, and under such circumstances valve drive amplifier 72 is sized accordingly for the increased power requirements. Switch 74 allows manual interruption of the automatic operation of the paint gun 80 and also serves to transfer control, when desired, to the customary semi-automatic electronic skipline timer 76 that will enable the painting of intermittant lines and is normally included with most all traffic paint marking vehicles.

Figure 6A:
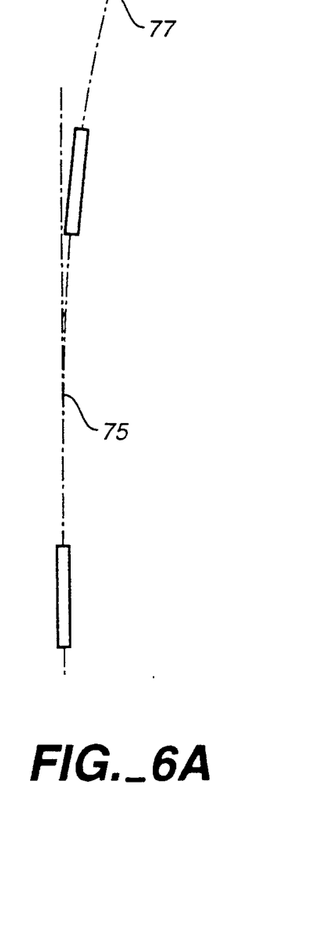
FIG. 6A is a diagrammatic plan view of a highway centerline shown at the tangent of a straight section and the start of a curved section of road.
Figure 6B:
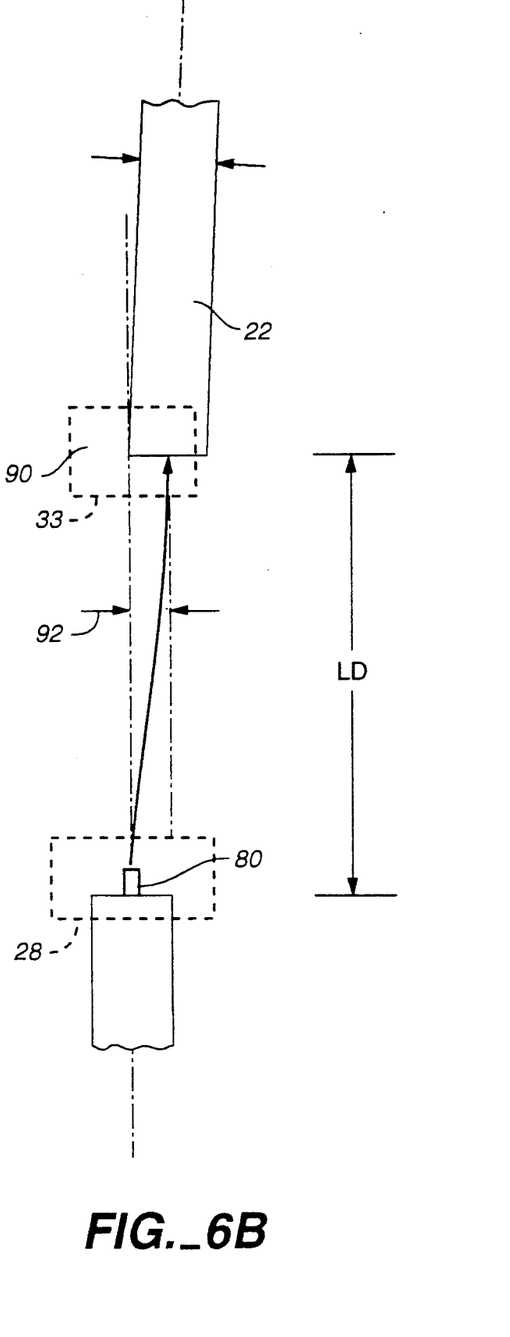
FIG. 6B is a diagram showing the lateral correction needed while underway for proper tracking.

FIG. 6A shows a diagrammatic plan view of a pavement centerline stripe 75 which is to be repainted at the junction of a curved section 77 of road following a straight portion. FIG. 6B illustrates the problem of tracking old paint 22, when the detector 33 views that portion of the line which is offset from the previous centerline of travel at a detector target surface 90 some lead distance LD ahead of the location of the paint gun 80. The error caused by a lateral offset 92 shown near the beginning of the curve is an example of that which must be corrected by laterally repositioning the paint gun 80 before the travel of the vehicle moves it into position at the target surface 90 where it is to be turned on.

Figure 7A:
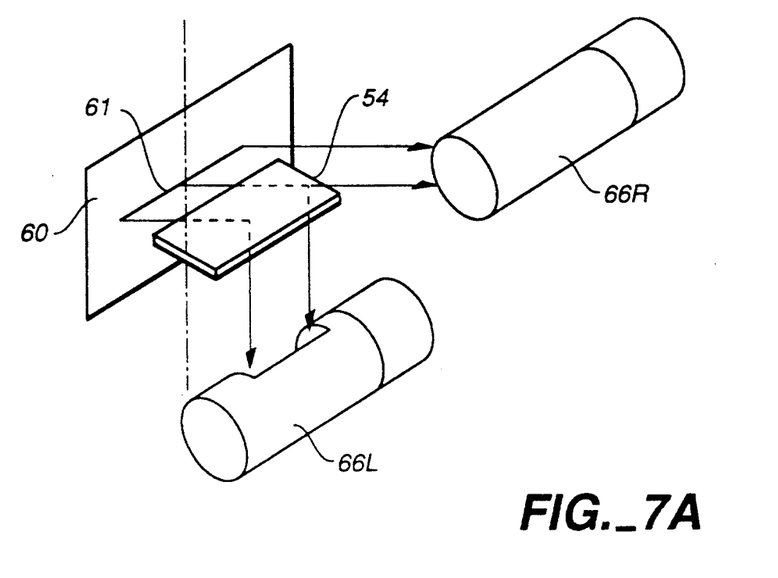
FIG. 7A is a diagrammatic view in perspective of an optical arrangement of elements for obtaining left-right split images for detection when used with lateral positioning correction means in accordance with the invention.
Figure 7B:
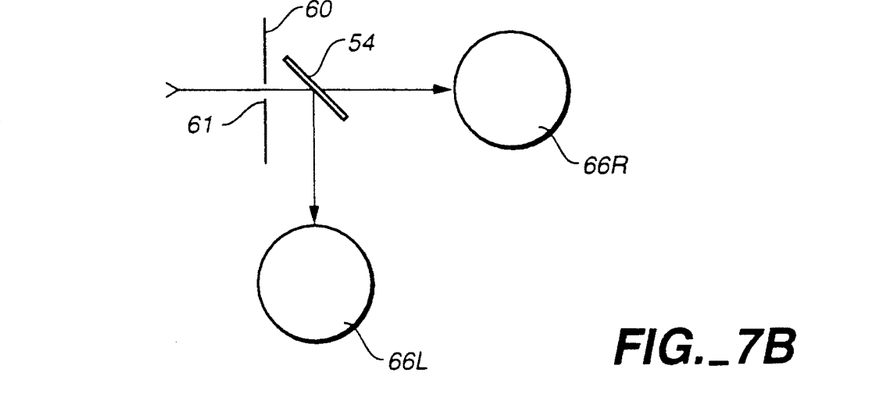
FIG. 7B is a plan view of the diagrammatic arrangement of FIG. 7A.

The embodiment of my invention shown in FIG. 4B automatically tracks the previously painted markings and includes the servo control 86, 88 for laterally positioning the paint gun to keep the new paint in alignment with the old paint. Here, the two photomultiplier tubes 66L and 66R of detector 33A are placed in an optical split field arrangement so that each views separate portions of the image plane of the exit mask 60 through its slit 61 (see FIGS. 7A and 7B). This is in contrast with that of using a single photomultiplier tube 66 shown in FIG. 5. Tube 66L responds only to return fluorescent emissions from the image left of the exit mask 60 centerline and tube 66R responds to returns from the image right of the exit mask 60 centerline.

There are some additional characteristics of the monochromator 62 that enhance the operability of my invention. As shown in FIG. 5, when the objective lens 46 focuses an image at the slit 53 of the entrance mask 52 the portion of the light passing through the slit 53 is that of an extremely thin cross sectional slice of that image, such as might be visualized by observing only a single horizontal scanning line of a television image. All of the features of the image in that thin slice are accurately positioned across the entrance slit 53 so that the portion of an object in view on the left side of the image will not enter the slit at the right side, and the reverse. The orientation of the entrance slit 53 with respect to the object plane in focus, in this case the target surface 90 will determine the rotational axis of the cross section of the image which is allowed to be processed by the monochromator 62. Of course the alignment of the other optical elements of the monochromator must be consistent with the choice of orientation of the entrance slit 53.

The exit mask 60 is also in a second image plane as relayed by reflections to and from the collimating mirror 56 and modified by the refraction grating 58. The image at any slit of the exit mask 60, whether it has only a single slit for passing a single wavelength, or has multiple slits, will be a focused slice of the cross section of target surface 90. When the entire monochromator 62 is correctly oriented, the emerging emissions from the exit mask 60 will have left-right characteristics in direct correspondence to that of a single unique transverse section of the roadway under observation at the target surface 90.

The useful field of view for the inspection package 32 is determined by its distance above the roadway, the choice of focal length of the objective lens 46, and the effective lengths of the entrance and exit slits of the monochromator. For a desired working height above the roadway of 12 inches, and using a monochromator 62 having an entrance slit 53 with an effective length of 1 inch, for example, the objective lens 46 may be a compound doublet consisting of the two 1 inch diameter lenses 50 and 51, each having a focal length of 1.5 inches spaced 0.3 inch apart. The effective focal length of the resulting compound objective lens 46 would be 0.83 inch. A field of view of 12 inches in width at the target surface 90 would be reduced to 0.895 inch at the image plane when focused on the entrance slit 53 of the monochromator 62. FIG. 5 also shows an iris 94 adjacent to the objective lens 46, which may be used to limit strong return fluorescent emissions and thereby avoid overloading the photomultiplier tube 66. Other optical arrangements utilizing the principles of my invention will suggest themselves to those skilled in the art.

As shown in FIG. 4B, the output signals of the photomultiplier tubes 66L and 66R are amplified separately by detector amplifiers 68L and 68R. For the purpose of controlling the on-off commands for the paint valve solenoid 78A, the two amplified signals are combined in the logic OR gate 82 that permits a signal from either photomultiplier tube or from the both of them to control the paint valve solenoid. In this respect the combination of the split screen detectors performs the same function as the more simple embodiment shown in FIG. 4A, although the arrangement shown in FIG. 4B has the additional capability of providing signals of positioning error due to lateral offset 92 (see FIG. 6B), which is needed by the servo control 86 for corrective action.

Detector amplifier 68L is connected to one input of differential amplifier 84 and amplifier 68R is connected to the other input. The differential amplifier has characteristics suitable for properly operating servo valve 86 which in turn controls positioning actuator 88 for moving the paint gun package 28 carrying paint gun 80 and the inspection package 32 containing the illuminating source 42 and spectroscopic detector 33. The choice of polarity of the connections to servo valve 86 is such that the signal operating the servo will cause motion of the positioning actuator 88 to go in the direction which reduces the error signal caused by imbalance of the inputs to the differential amplifier 84 in a closed loop negative feedback fashion. When the spectroscopic detector 33 is centered on the line of old paint 22 existing at the target surface 90 under inspection, the two detector outputs will be equal and no error signal will result at the output of differential amplifier 84 causing the servo loop to be satisfied. To the extent that both photomultiplier tubes are simultaneously in view of some part of the paint line, the system will operate as a proportional control. This will occur over a distance of twice the actual line width. For example, if the line is typically 4 inches in width, the error signal will be proportional to displacement from the centerline for plus or minus 4 inches of lateral motion. Proportional control is a most desirable feature of servo control systems of this type in order to reduce overshoot and inhibit any tendency toward undesirable oscillations or instability. Such a fast, stable servo is said to be "stiff" in describing its responsiveness.

With regard to lead distance correction relative to gun turn-on delay times, it has already been shown that paint gun turn-on delays become non-trivial at turnpike rates of travel and the inspection package 32 must be located ahead of the paint gun package 28 so as to anticipate the actual dispensing of the paint, by the amount of time of turn-on delay. If, for example, it requires 20 milliseconds of response time for the paint gun to operate, then by locating the inspection package 21.12 inches ahead of the paint gun, the delay will be perfectly compensated for at a speed of 60 mph, but only at that speed (see FIGS. 9a and 9b). At lower speeds the paint will be turned on too soon and cause the new paint to precede the desired location, such that at a limit of a complete standstill, the paint would lack 21.12 inches of being correctly placed. The prior art method of eliminating the high speed problem created another problem just as serious at low speeds. Even at very low but not improbable application rates of travel, the lack of coincidence would be substantial. At 6 mph there would be approximately 19 inches of error. Thus, there must be a correction factor in addition to the lead distance method for satisfactory operation at other than only one rate of travel. In the present method, this is achieved by using the delay line 70 shown in FIG. 4, and further illustrated in FIG. 8.

Paint Gun Turn-On Delay

Manipulation of the standard rate-time-distance formula $$t = d/r \qquad \text{(Equation 1)}$$

for application rates over a span of 3 mph to 60 mph will yield transit times $t_t$ for the vehicle to travel the 21.12 inches of lead distance LD. This when added to the assumed valve turn-on delay $t_v$ of 20 milliseconds, will result in the correction $t_d$ required to be provided by the delay line 70:

| RATE | VALVE DELAY $t_v$ | TRANSIT TIME $t_t$ | DELAY LINE $t_d$ |
| --- | --- | --- | --- |
| 60 mph | −20 ms | +20 ms | 0 ms |
| 30 | −20 | +40 | 20 |
| 20 | −20 | +60 | 40 |
| 10 | −20 | +120 | 100 |
| 6 | −20 | +200 | 180 |
| 3 | −20 | +400 | 380 |

From this it is seen that no correction is needed at 60 mph; the transit time has completely neutralized the gun turn-on delay, but at lower rates of travel considerable additional delay is required beyond that of the 20 millisecond valve turn-on delay. The required additional delay does not vary in a linear fashion. Were it not for the fixed constant of 20 ms added in each instance, the variation in transit time alone would be a perfect fit for an x-y coordinate plot of a power function of the form $$y = ax^{-b} \quad \text{(Equation 2)}$$

Where rate is plotted as abscissa values x and delay is plotted as ordinate values y.

With the valve turn-on delay $t_v$ constant added, a plot of the sums giving the additional delays required is a less than perfect fit to the power function curve of Equation 2. My invention totally disposes of the problem and provides a near perfect fit for the required function (see FIGS. 9a-9f).

Figure 8:
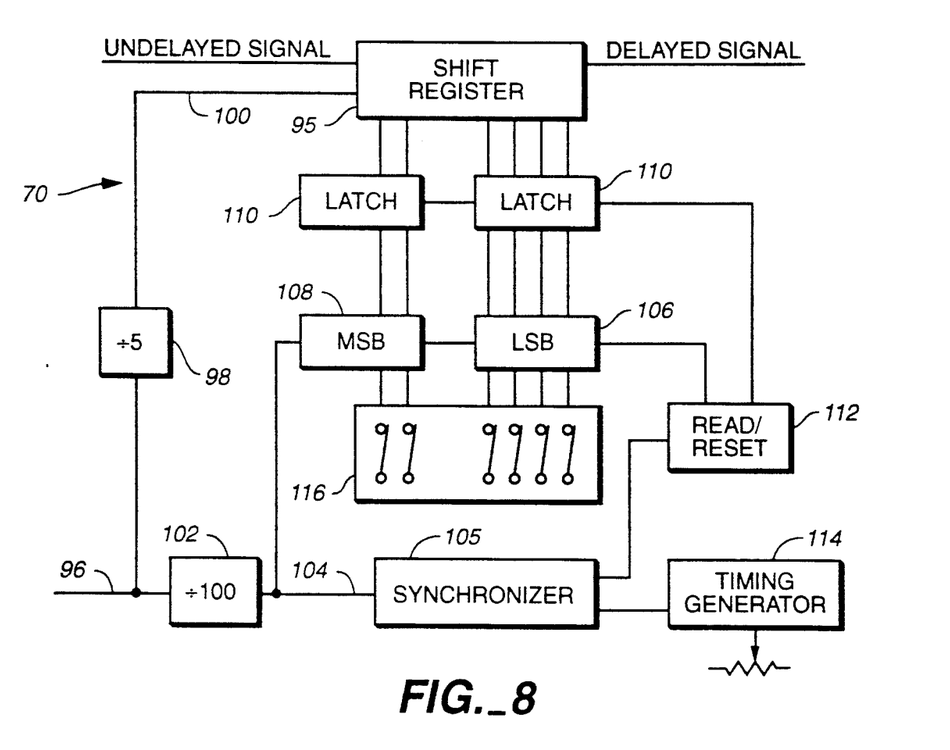
FIG. 8 is a block diagram showing the variable delay line used for gun valve delay correction according to the invention.

Expanded detail of the features of the clocked programmable delay line element 70 of FIG. 4 is shown in FIG. 8. The signal delay is produced by the incremental movement of the undelayed signal through a variable length shift register (VLSR) 95, comprised of a series of successively clocked digital shift registers, where each clock pulse transports the signal from one register to the next. Such a series of clocked registers act as a digital bucket brigade for any signal input. Upon entering the input stage of 95, a given signal will travel through the series and reach the output whenever the number of clocked transitions equal the number of shift registers in the chain. If the clock pulses occur at a uniform rate, then the delay line 70 has a fixed time delay. A change in the rate of the clock pulses changes the amount of time a signal resides in the line and thus changes the delay time which is in inverse ratio to the rate of clock pulses.

The delay may be varied by change in clock frequency, by change in the number of shift registers in the chain that are in use at any given interval of time, or by both methods in combination.

In this embodiment of my invention both methods are used. The clock pulses for shift register 95 come from the distance measuring equipment normally supplied as a part of the traffic paint marking control or by some means that provides pulses in direct relation to distance of vehicle travel, as for example, a series of pulses occurring at intervals of 1/100th foot of travel. A delay line clocked in this fashion will exhibit a time delay that is inversely proportional to speed of travel which is an implicit solution of Equation 2. This reciprocal relationship will give substantially most of the correction needed at very low rates of travel. The remainder of the error is corrected by multiplication by a linear term having the form of the equation for a straight line $$y = a - bx \quad \text{(Equation 3)}$$

where rate is plotted as abscissa values x and delay is plotted as ordinate values y.

This function having a negative slope is produced by causing the delay line 70 to have maximum delay at the lowest rates of travel, and having the delay reduced as the rate of travel is increased and is done by shortening the length of the programmable variable length shift register 95 in a linear manner with increasing vehicle rate of travel. The resulting expression for delay time $t_d$ as a function of rate is $$t_{d}(r) = \frac{t_m r_m (a - br)}{r} \quad \text{(Equation 4)}$$

where
- $t_d$ = delay line correction
- r = Rate of travel
- $r_m$ = Maximum rate r reference
- $t_m$ = Maximum selected limiting delay at $r_m$
- a = Coefficient a of Equation 3
- b = Coefficient b of Equation 3

FIG. 8 shows one method of implementing the incremental shortening of the effective length of the delay line 70 as the vehicle rate increases. The variable length shift register (VLSR) 95 is a type MC14557B static clocked serial shift register whose length may be programmed to be any number of bits between 1 and 64. The input signal submitted to the delay process is that of either the output of the detector amplifier 68 in the embodiment of my invention shown in FIG. 4a, or the output of the logic OR gate 82 in the embodiment in FIG. 4b. The clock input, as described previously, is a series of pulses that occur for each measure of travel. These pulses are available in measures of 0.01 ft per pulse, and of 0.10 ft per pulse from the Research Derivatives, Inc. Model 304H series of traffic paint controls, and from other brands as well, included in the environment of the traffic paint marking vehicle 20 (see FIG. 1). In the example of FIG. 8, 0.01 foot pulses in lead 96 are used and divided by 5 by a divider 98 to clock the VLSR 95 at 0.05 foot intervals of travel in lead 100, and also divided by 100 with a divider 102 to produce pulses in lead 104 at 1.0 foot intervals which is connected to a synchronizer 105 and counters 106 and 108.

The VLSR 95 bit length is periodically set by entry of 6 bit binary words into its length programming inputs. These length determining words are derived from cascaded type MC14516B 4 bit binary counters 106 and 108 which in a continuous process are counting the 1.0 foot interval travel measuring pulses 104, for short fixed regularly occurring intervals. The total counts at the end of each interval are transferred to a type MC14508B dual 4 bit latch 110 which holds the accumulated value of the count for the next counting interval and is used as the work input to the VLSR 95 while the next sample is acquired by the counters. The transfer of the length determining word and the reset of the counters 106 and 108 is done by a read-reset circuit 112 at times determined by a timing generator 114. The binary counters 106 and 108 are used in the down count mode; that is, a chosen binary maximum count is preloaded into the counters before the start of the counting interval and the counters then count down from that maximum number toward zero. The preset number is a fixed number determined by the settings of 6 binary switches of a series of preset switches 116.

The VLSR 95 cannot be programmed for zero delay. The least possible delay is that which results from reducing the number of active shift registers to 1. It is not necessary to require zero delay at the maximum operating rate $r_m$ if the lead distance LD (see FIG. 3) is increased slightly so that a finite amount of delay from delay line 70 (see FIG. 4) may remain to cancel out the excess lead correction. This has the effect of placing $r_m$, the rate at which transit delay $t_t$ alone completely cancels valve delay $t_v$, at a rate higher than the top operating speed.

At high rates of travel, the stream of 1.0 foot pulses 104 will rapidly cause the preset entry number loaded in counters 106 and 108 to decrease toward zero. At low rates of travel, the counts will more slowly deplete the preset number and the remaining count at the end of the counting interval will remain high. The result is that the effective electrical length of the VLSR 95 whose length is proportional to the length of the word entry to its program inputs, will be shortest at high rates of travel and longest at the lowest rates of travel. The fixed binary word length of the preset switches 116 sets the maximum effective length of the VLSR 94 which is then reduced by subtraction to that length of the binary word finally transferred by the latch 110 at the conclusion of each counting interval. These techniques are similar to those used in digital to analog converters, digital counters and interval measuring instruments, digital voltmeters, and many other pulse counting applications. With properly chosen operating parameters, units of measure, and timing intervals, the method and means shown in FIG. 8, contained within the block 70 of FIG. 4, will provide the correct solution of Equation 4 and will result in essentially perfect compensation of timing errors due to paint gun turn-on delays for all rates of travel.

To illustrate the paint gun delay feature of the invention, some preferred assigned values of operating parameters may be assumed for delay line 70, such as interval timings, effective delay line length, distance measure clock pulse intervals and the like for a paint valve turn-on delay of 20 milliseconds. For the purpose of retaining a finite delay at the highest operating rate $r_h$, the lead distance is selected to be one that would require 25 milliseconds of travel time instead of the 20 milliseconds of valve delay time that is being corrected. This then permits a residual delay of 5 milliseconds. For an assumed $r_h$ of 60 mph, the lead distance LD (see FIG. 3) is 2.2 feet. In FIG. 8, it is shown that the VLSR 95 is being clocked with a stream of 0.05 foot interval pulses. In order for the VLSR 95 to contain an electrical equivalent of 2.2 feet in 0.05 foot increments, it must have a length of 44 active registers. That is the decimal equivalent of the binary number selected for setting the preset switches 116. The residual minimum delay of 5 milliseconds required at $r_h$ of 60 mph will occur with the passage of 0.44 foot of travel, corresponding to the occurrence of 8.8 successive 0.05 foot pulses. The closest integer of whole pulses possible is the number 9. Therefore, down counters 106 and 108 must reduce the preset number 44 by 35 counts during the counting interval determined by the timing generator 114 when the rate of travel is 60 mps. The count reduction is being done at increments of 1.0 foot of travel, so at 88.0 ft per second (60 mph) it will require the count to proceed for 398 milliseconds. Only a few milliseconds are required to transfer the count to the latch 110, download the new number to the VLSR 95 and for a synchronizer 105 to set the start of the next counting interval. Thus, the refresh rate is approximately 2½ times per second to periodically recalibrate the delay line 70 length (see FIG. 4) while travelling.

Figure 9A:
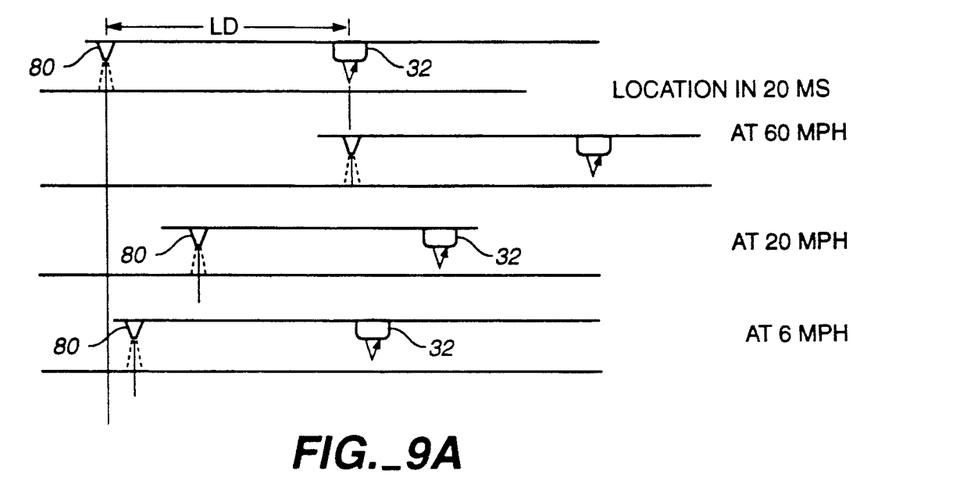
FIGS. 9A, 9B, 9C, 9D, 9E and 9F are a series of time and motion diagrams related to timing corrections for gun valve delays.

FIGS. 9A-9F show time and motion diagrams that illustrate the relationships between travel time $t_t$, valve delay time $t_v$, delay line delay $t_d$, and the time of the valve turn-on event $t_{to}$, for different assumed rates of travel. FIG. 9A shows the effect of lead distance LD with respect to position of the gun 80 at turn-on for an assumed valve delay of 20 milliseconds for travel of the vehicle 20 at various rates. It is illustrated that at 60 mph, the gun has been moved exactly 21.12 inches in the 20 ms before the gun turns on and has reached the target 90 at that time. At 20 mph, it is shown that the gun 80 has traveled only slightly more than 7 inches, and lacks some 14 inches of being in correct placement. At 6 mph, the gun 80 still lacks 19 inches of correct placement at the time it operates. These errors are characteristic of the prior art methods that rely only on lead distance separation to correct for gun timing delays.

Figure 9B:
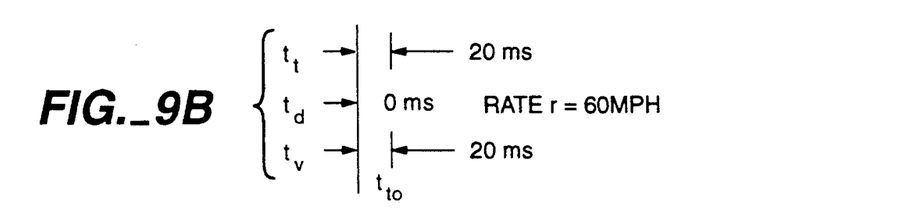
Figure 9C:
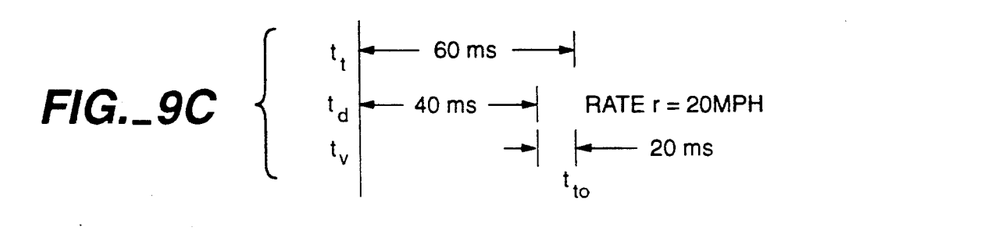
Figure 9D:
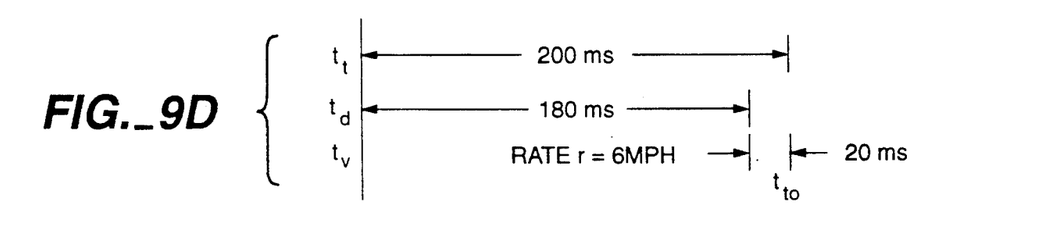

FIG. 9B shows plots of valve delay time $t_v$, travel transit time $t_t$, delay line correction $t_d$ of zero and shows the effective cancellation of valve delay $t_v$ by the travel transit time $t_t$ at the valve turn-on time $t_{to}$ at an assumed maximum rate of travel of 60 mph. FIG. 9C shows that at a slower speed of 20 mph, the transit time $t_t$ has increased to 60 ms and that additional delay time $t_d$ of 40 ms must be added to the valve delay $t_d$ of 20 ms in order for turn-on $t_{to}$ to occur at the conclusion of the $t_t$ delay. FIG. 9D shows the even more drastic correction that must be provided by the delay line 70 delay time $t_d$ at the rate of 6 mph where an additional 180 ms of additional delay must be provided beyond that of the fixed 20 ms of valve delay $t_v$.

Figure 9E:
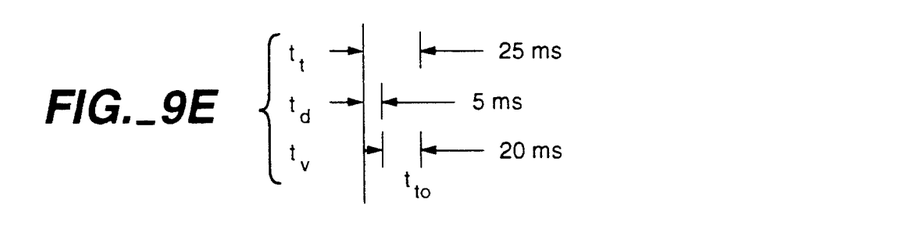

FIG. 9E shows the result of using the method and structure depicted in FIG. 8 where the transit time $t_t$ correction is slightly longer than that of the valve delay $t_v$ at the highest operating rate $r_h$, so that $t_d$ has a small residual delay at 60 mph.

The techniques just described for correction of paint gun delay times will also work equally as well for the much longer delay times of the operation of the separate guns 38 that dispense glass reflecting beads. The beads are almost universally used along with the paint and are applied immediately on top of the wet paint to which they adhere and provide higher nighttime visibility than that of the paint alone. These beads are tiny polished solid glass spheres having about the same consistency as the fine sand contained in hour glass timers. They are usually dispensed under air pressure to assist the flow through the dispensing valve, and thus gain a higher exit velocity than if they were to be simply released by gravity alone. Compared to the much higher exit velocity of a high pressure paint gun, the bead release time is slow.

Typical bead gun delay times may be from 50 milliseconds in the low range to in excess of 150 milliseconds for ones having longer operating times. Lead distance correction has been used to alleviate the problem in the past, but using prior art uncompensated separation between paint and bead guns heretofore resulted in the correction being effective at one single rate of travel, and greatly mismatched registration of all other rates. My method, as previously described for paint gun delay correction, requires only that it be changed in scale for the appropriate bead gun delay times, in order to correct for bead gun delay errors at all practical rates of travel. Because of the greater timing error for the bead gun, the lead distance is greater than that used for the paint gun separation and thus a bead gun 38 is mounted further toward the rear of the vehicle 20 than that of the paint gun package (see FIG. 3). A typical distance between the target surface 90 and the location of the bead gun 38 might be on the order of 9 feet to correct for a nominal bead gun operating delay of 100 milliseconds at 60 mph (see FIG. 9F). All of the structure shown in FIG. 8 contained within the delay line 70 (see FIG. 4) is duplicated for bead gun control so as to provide for separate paint gun and bead gun compensation. This is more clearly illustrated in FIG. 4C which shows the two separate signal paths that follow the common output of amplifier 68, one that leads to the paint gun solenoid 78 having characteristics to correct for paint delay problems, the other path, by way of the separate bead delay line 71, bead valve drive amplifier 73 and the contacts of a switch 75 leads to the bead gun solenoid 79 and separately optimizes registration of glass bead application with that of the paint.

The technique for selecting parameters for delay 71 for bead timing errors is similar to that used for correcting paint gun timing errors, except that the scale of correction is on the order of 4 to 6 times larger in magnitude.

Figure 9F:
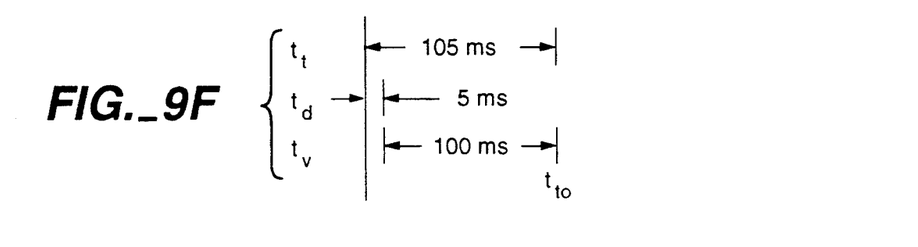

FIG. 9F shows the relative delays and corrections that are made for an assumed bead gun delay of 100 ms at the same highest operating rate $r_h$ of 60 mph as that shown for paint gun timing in FIG. 9E.

My method for correction of gun delay times as described will give perfect correction at all speeds of travel if the delay line employed has infinite resolution. Clocked delay lines, by their very nature, are stepwise in operation and the smallest possible increment of correction is one step of the sampling process. In the examples just described, the departures from the ideal correction correspond to within plus or minus 0.05 foot for paint and plus or minus 0.10 foot for bead correction at any practical speed of application up to 60 mph.

There distinct advantages to chopping the input signal of low level signal processing devices, such as photo detectors. The chopping process modulates the optical input signal at a rapid rate, and when the output of the device is AC coupled, the AC component may be amplified separately from any static or slowly changing high level background signal level. When the photodetector is a multi-stage photomultiplier tube requiring anode and dynode voltages on the order of 1000 volts or greater, it is advantageous by AC coupling, to de-couple the relatively small signal from the high DC potential. The chopping process also automatically establishes a fixed background black level reference for the output signal.

Figure 10:
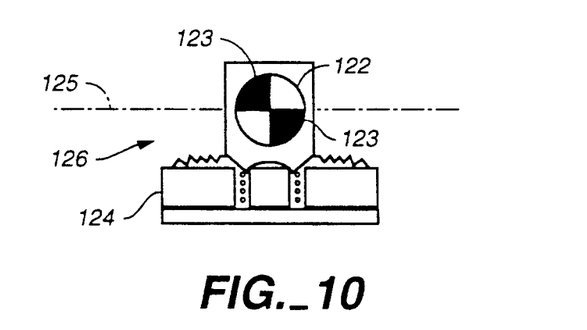
FIG. 10 is a view in elevation of an optical chopper for use with the present invention.
Figure 11:
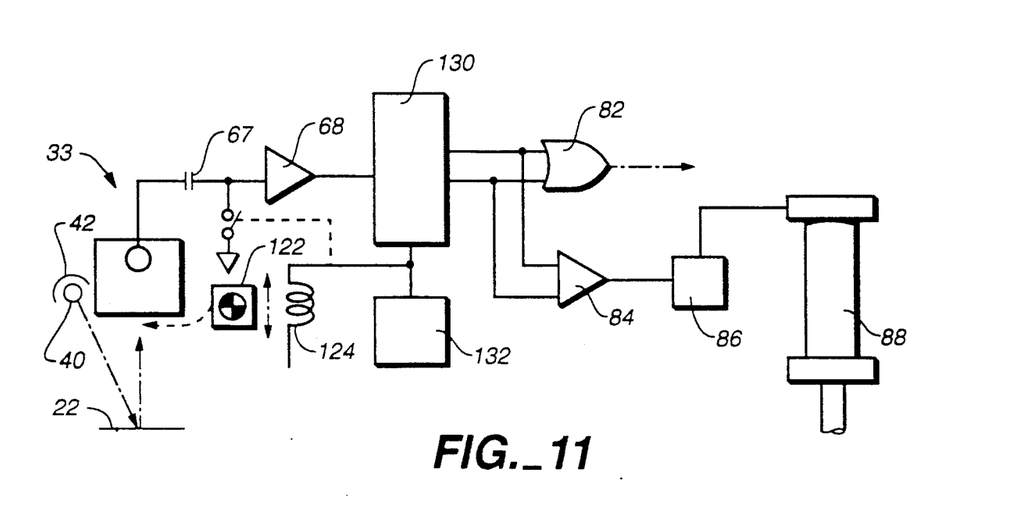
FIG. 11 is a block diagram of an embodiment of the present invention using optical chopping to provide left-right error signals to drive a lateral positioning servo.

Shown in FIG. 11 is one embodiment of my invention that uses optical chopping of the input signal to the monochromator 62 shown in FIG. 5, for the purposes just described, but also for additional reasons as well. The portion of the optical image focused on the entrance mask 52 that passes through its slit has been described as a transverse section of the roadway beneath the detector 33 when the device has been properly oriented with respect to the area of the roadway being inspected. This means that an obstruction of any portion of the length of the mask slit 53 deletes the signal from only that relative portion of the optical field being inspected. By alternately blocking first one half of the light entering the entrance slit 53, then the other half, then the output emissions from the exit mask 60 will be modulated in such a fashion that the left and right components of the optical input signal may be separately retrieved by synchronous demodulation of the output signal of only one photodetector viewing the entire exit mask. An optical interrupter 122 to chop the input illumination is located immediately adjacent to the monochromator entrance slit 53 and consists of an assembly appearing as two adjacent knife-edge opaque areas 123, slightly overlapping an axis 125 that is parallel to the longitudinal axis of the entrance slit 53 of the monochromator 62. The shape of the opaque portions of the device is shown in FIG. 10 which also illustrates the method of mechanically driving its motion. The surface of the interrupter 122 is vibrated across the optical path at a rate of approximately 800 Hertz by the motion of a motor 124 of the voice coil type used for driving audio loudspeaker diaphragms. The combination of the interrupter 122 and driving motor 124 comprise an optical chopper assembly 126.

The chopping method described is for illustration only and the substitution of a vibrating mirror, rotating wheel, or high speed optical polarizer will suggest themselves to one skilled in the art.

FIG. 11 shows how the modulated output of detector 33 is AC coupled through a capacitor 67 to detector amplifier 68, thence the path goes to a phase sensitive synchronous demodulator 130 which provides the left-right signals for differential amplifier 84 which in turn drives servo valve 86 for positioning actuator 88 and also provides the input signals through logic gate 82 that control the gun turn-on and turn-off operations. An 800 Hz oscillator 132 provides the reference signal for the synchronous detector 130 as well as the driving frequency source for the chopper motor 124.

Figure 12:
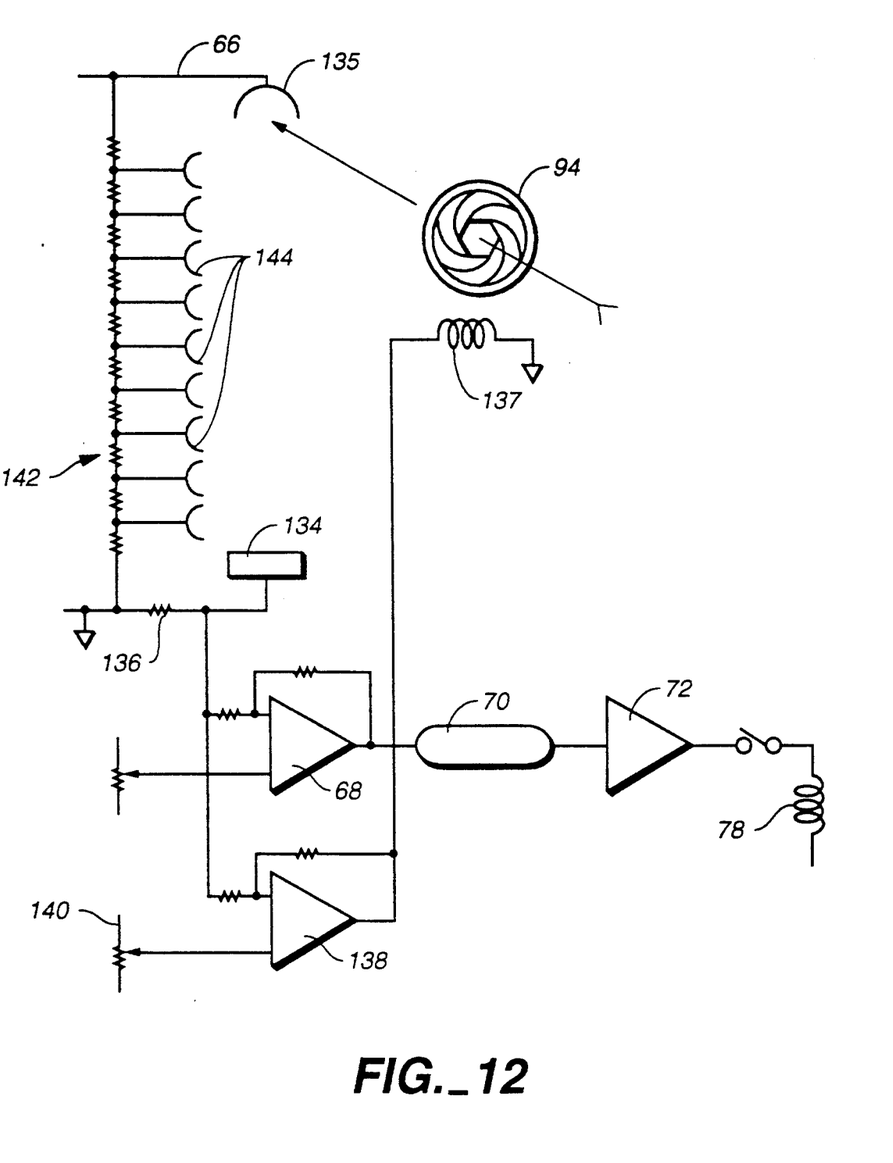
FIG. 12 shows a partial schematic of diagram of the photomultiplier circuit in combination with block diagram of an automatic light level control according to the invention.

FIG. 12 shows a simplified schematic of an arrangement for an automatic light level control to prevent input overload for a type IP28A photomultiplier tube 66. The useful output signal of the photomultiplier 66 is the variation of current drawn by its anode 134 supplied by secondary electron emission contributed by dynodes 144 when the photocathode 135 receives photoemission, which causes a voltage drop across load resistor 136. The signal provides the input to amplifier 68 and the path leading to the valve solenoid 78. The output from amplifier 68 is fed through the delay 70 to the paint gun solenoid 78 as previously described. The signal is also applied to the input of an iris control amplifier 138, the output of which operates an actuator 137 for the adjustable iris 94 which is located in the non-image plane of the light path adjacent to objective lens 46 (see FIG. 5). A threshold adjustment potentiometer 140 is provided to permit the input light level to reach a point just short of overload before the iris will cause a reduction in intensity. This assures maximum linearity of output over the greatest range of input levels. The tube can also be protected against destructively high anode currents by properly proportioning the voltages of a tapped voltage divider 142 that are being provided for its dynodes 144. By reducing the voltage between the last dynode and the tube anode to a low value, the anode current will be space charge limited to some desired maximum value. This provides the light level control necessary to protect the photomultiplier tube 66.

To those skilled in the art to which this invention relates, many changes in construction and widely differing embodiments and applications of the invention will make themselves known without departing from the spirit and scope of the invention. The disclosure and the description herein are purely illustrative and are not intended to be in any sense limiting.

What is claimed is:

1. A method for repainting old traffic lane pavement markings on road surfaces comprising:
   providing a vehicle capable of movement along the pavement and having a detection means for old markings on the pavement, a paint dispenser means and a control means for said dispenser means;
   illuminating the surface with spectral emissions and causing return fluorescent emissions from the illuminated surface;

focusing the return emissions on the entrance slit of a spectroscope;

separating the spectrum of the return emissions into its component wavelengths;

at the output of the spectroscope, masking all but one or more wavelengths emitted by a specific chemical contained in the makeup of the paint being sought;

directing the desired remaining emission wavelengths into a photodetector;

amplifying the amount of any output signal from the photodetector;

measuring the amount of signal above a threshold level for determining the presence of any painted marking containing said specific chemical;

initiating said dispenser control means when the measured signal exceeds the threshold; and applying new material to the pavement surface with said dispenser means in response to the detection method.

2. The method of claim 1, including locating the detector means a lead distance ahead of the dispenser means, delaying the operation of the dispenser control means relative to the velocity of the vehicle so as to dispense material precisely on the area viewed by the detector means.

3. The method of claim 2, wherein the dispenser control means is delayed by:

entering any signal measured above the threshold into a delay line of variable effective length n;

causing the delay $t_d$ of said delay line to be inversely proportional to the rate of vehicle travel r for a given effective length n, varying the length n of the delay line such that at any given moment its effective length n is an inverse linear function of the rate of travel r, using the output of the delay line for initiating said dispenser control means.

4. The method of claim 1 including;

measuring the output of the photodetector;

amplifying the measured photodetector output that exceeds a threshold; and using the amplified output exceeding said threshold for operating a current controlled adjustable iris located in the optical path of the spectroscope in such a manner as to oppose any change of optical signal level above said threshold.

5. The method of claim 1 including;

optically chopping the return emissions at a rapid rate, thereby alternately interrupting and allowing passage of the focused emissions onto said entrance slit.

6. The method of claim 5 wherein the detector assembly is located a lead distance ahead of the paint dispensing device on the vehicle and the initiating valve operating current is delayed by:

entering any signal measured above the predetermined threshold into a delay line of variable effective length n, causing the delay $t_d$ of said delay line to be inversely proportional to the rate of vehicle travel r for a given effective length n;

varying the length n of the delay line such that at any given moment its effective length n is an inverse linear function of the rate of travel r;

using the output of the delay line for initiating the valve operating current.

7. A method for repainting old traffic lane pavement markings on road surfaces comprising:

providing a vehicle capable of movement along the pavement and having a detection means for old markings on the pavement, a paint dispenser means and a control means for said dispenser means;

illuminating the surface with spectral emissions and stimulating return fluorescent emissions from the illuminated surface;

focusing the return emissions on the entrance slit of a spectroscope;

separating the spectrum of the return emissions into its component wavelengths;

at a output of the spectroscope, masking all but one or more wavelengths emitted by a specific chemical contained in the makeup of the paint being sought;

dividing the image plane across the mask into two paths, one being the optical path from the left side image, the other being that from the right side;

directing remaining emission wavelengths from the divided halves into two separate photodetectors;

separately amplifying the output signal from the photodetectors;

deleting the amplified signals below a threshold level;

logically ORing the remainder of the two signals in a logic OR gate;

initiating a valve operating current whenever either or both said amplified signals exceed said threshold level;

operating a valve controlling the material application;

applying the new material to the pavement surface in response to the detection method;

comparing the amplified output left side and right side signals in a linear differential amplifier to create an error signal that is proportional to the amount and direction of the lateral misalignment of the detector assembly with respect to the center of the old traffic markings on the surface of the pavement; and modulating the power to a positioning actuator that controls the lateral position of the spectroscopic detector and material applicator in response to said error signal.

8. The method of claim 7 wherein the detector on said vehicle is located a lead distance ahead of the dispensing device and the initiating valve operating current is delayed by:

entering any signal at the output of the logic OR gate into a delay line of variable effective length n, causing the delay $t_d$ of said delay line to be inversely proportional to the rate of vehicle travel r for a given effective length n, varying the length n of the delay line such that at any given moment its effective length n is an inverse linear function of the rate of travel r;

using the output of the delay line for initiating the valve operating current.

9. The method of claim 7 including the steps of:

measuring the output of each of the two photodetectors;

comparing the two photodetector outputs to determine which of the two is the greater in signal amplitude;

amplifying the greater of the two that exceeds an adjustable threshold;

using the amplified output that exceeds said threshold for operating a current controlled adjustable iris located in the optical path of the spectroscope in such a manner as to oppose any change of input optical signal level above said threshold.

10. A method for repainting old traffic lane pavement markings on road surfaces comprising:

providing a vehicle capable of movement along the pavement and having a detection means for old markings on the pavement, a paint dispenser means and a control means for said dispenser means;

illuminating the surface with spectral emissions to cause return fluorescent emissions from the illuminated surface;

focusing the return emissions on the entrance slit of a spectroscope;

optically chopping the return emissions at a rapid rate, alternately interrupting first the focused emissions onto one half of said entrance slit while allowing passage through the other half, then interrupting the emissions to the other half while allowing passage through the first half, each half being illuminated approximately 49% of the time with slight overlap of the time both halves are obscured by the interrupter;

dividing the spectrum of the return emissions into its component wavelengths;

masking at the output of the spectroscope, all but one or more wavelengths emitted by specific chemicals contained in the makeup of the paint being detected;

directing remaining emission wavelengths into a photodetector;

coupling the output of the photodetector through a capacitor;

amplifying the capacitor coupled output signal from the photodetector;

clamping the output side of said capacitor to ground during the time interval of the optical dark time overlap;

generating a driving signal to operate the optical chopper;

generating a clamp pulse synchronized to occur during said dark time overlap;

demodulating the amplified photodetector signal to provide two demodulated signals 180° out of phase with each other;

logically ORing the two demodulated outputs in a logic OR gate;

initiating a valve operating current whenever either or both said amplified demodulated signals exceed a threshold;

operating a valve controlling the material application;

applying new material to the pavement in response to the detection method;

comparing the two demodulated signals in a differential comparator to create an error signal that is proportional to the amount and direction of the lateral misalignment of the detector assembly with respect to the center of the old traffic markings on the surface of the pavement; and modulating the power to a positioning actuator in response to said error signal to control the lateral position of the spectroscopic detector and dispensing device in such a manner as to reduce any lateral positioning error.

11. The method of claim 10 wherein the detector assembly is located a lead distance ahead of the paint dispensing device on the vehicle and the initiating valve operating current is delayed by:

entering any signal at the output of the logic OR gate into a delay line of variable effective length n;

causing the delay $t_d$ of said delay line to be inversely proportional to the rate of the vehicle travel r for a given effective length n;

varying the length n of the delay line such that at any given moment its effective length n is an inverse linear function of the rate of travel r;

using the output of the delay line for initiating the valve operating current.

12. The method of claim 10 including:

measuring the output of the photodetector;

amplifying the measured photodetector output that exceeds a threshold;

using the amplified output exceeding said threshold for operating a current controlled adjustable iris located in the optical path of the spectroscope in such a manner as to oppose any change of optical signal level above said threshold.

* * * * *